United States Patent

[11] 3,616,165

[72] Inventor Tetsuo Nishi
 No. 24-10, 7-chome, Umeda, Adachi-ku,
 Tokyo, Japan
[21] Appl. No. 634,509
[22] Filed Apr. 28, 1967
[45] Patented Oct. 26, 1971
[32] Priorities May 4, 1966
[33] Japan
[31] 41/27891;
 May 4, 1966, Japan, No. 41/27892

[54] SUPER-STRONG CORD AND TAPE COMPOSED OF POLYVINYL ALCOHOL FIBERS
 6 Claims, No Drawings
[52] U.S. Cl. .................................................. 161/143,
 57/140 C, 117/138.8 PV, 156/167, 156/180,
 161/167, 161/175, 264/185, 264/210
[51] Int. Cl. .......................................................... D02g 3/36,
 D02g 3/40
[50] Field of Search ........................................... 161/175,
 176, 143, 144, 167, DIG. 6; 264/185, 210; 57/140
 C, 153; 117/7, 138.8, 138.8 UA, 138.8 U, 138.8 A;
 156/167, 180

[56] References Cited
UNITED STATES PATENTS

| | | | |
|---|---|---|---|
| 2,856,750 | 10/1958 | Lewis | 57/140 C X |
| 3,091,018 | 5/1963 | Rees | 161/143 |
| 3,248,274 | 4/1966 | Karass | 161/143 X |
| 3,039,913 | 6/1962 | Merrill et al. | 117/138.8 U |
| 3,210,147 | 10/1965 | Johnson et al. | 117/138.8 PUA |

OTHER REFERENCES

Moncrieff, R. W. Man-Made Fibres (4th ed. Revised) Heywood Books; London (1966). Page 436 relied on.

*Primary Examiner*—Robert F. Burnett
*Assistant Examiner*—Raymond O. Linker, Jr.
*Attorney*—Rupert J. Brady ABSTRACT: Cord and tape composed of continuous polyvinyl alcohol fibers which were highly strengthened by repeatedly immersing in the same kind of polyvinyl alcohol solution.

SUPER-STRONG CORD AND TAPE COMPOSED OF POLYVINYL ALCOHOL FIBERS

BACKGROUND OF THE INVENTION

This invention relates to superstrong cord and tape composed of polyvinyl alcohol fibers, commonly called poval resin fibers in the trade in Japan, which are produced by extrusion of aqueous polyvinyl alcohol solution in accordance with the known extrusion method.

An object of this invention is to produce highly stronger cord and tape than the known cords and tapes composed of vegetable or artificial fibers.

After various studies, the inventor has succeeded in the production of said stronger cord and tape by several times repeatedly immersing a bundle of polyvinyl alcohol fibers composed of in the same polyvinyl alcohol solution.

According to the present invention, for the polyvinyl alcohol it is preferable to select and use pure completely saponified resin of about 1700 polymerization degree and to dissolve 13–18 parts of the resin into 87–82 of water to give an aqueous polyvinyl alcohol solution.

The continuous polyvinyl alcohol fibers used in this invention may be produced by continuously extruding the polyvinyl alcohol solution in the usual extrusion method into a spinning bath containing saturated solution of sodium sulfate. In the production of superstrong cord and tape of the present invention, it is advisable to use a unit fiber bundle composed of approximately 350 continuous filaments, one filament being 10 denier. In the case of cord, said unit fiber bundle of 3500 denier is temporarily dried as it is. In the case of tape, a number of said bundles are arranged in side-by-side relation for a desired width of tape and temporarily dried. The temporarily dried cord or tape is immersed in the polyvinyl alcohol solution. Said immersion treatment is advantageously repeated several times so that in the case of cord, about 1.6 cc. of 10% polyvinyl alcohol solution per 1 meter of cord and in the case of tape about 15 cc. of 10% polyvinyl alcohol solution per 1 meter of, for example, 13 mm. width tape may be adhered thereto respectively. The cord or tape repeatedly immersed in this way is dried by means of any suitable drying method. After drying, the cords are at once subjected to first twisting operation and then a 2-piece set of cord are subjected to second twisting operation and taken up or reeled up at a suitable speed.

According to the present invention, in order to prevent the side edges of a tape from damage and from leakage of the resin solution it is preferable to arrange and fix slightly twisted yarns of the same kind of fibers on both sides of the tape. The tape of the present invention may be coated on one side with a suitable adhesive solution and dried to give an adhesive tape. In this case, it is necessary to protect the other side by coating it with a protecting layer consisting of, for example, silicon solution. The cord and tape of the present invention may be dried by any known drying means. It is advisable to dry the cord with hot air at 130° C. and the tape by drying cylinders at 140°–200° C.

According to the present invention, colored cord and tape may be produced by using colored polyvinyl alcohol solution.

When the polyvinyl alcohol fiber is repeatedly immersed in the same polyvinyl alcohol solution the fibers in the bundle and the solution are closely incorporated as a unit in a body and complete fixation of the fibers to each other may be attained based upon the characteristics of the polyvinyl alcohol fibers which stand heat to about 230° C., do not contract and have water-absorbability of about 3–5%, thereby the desired superstrong cord and tape may be obtained.

For the polyvinyl alcohol fibers in the present invention, untwisted long fibers of the continuous type are recommended.

The superstrong cord and tape of this invention are very beautiful and exhibit very high tensile strength, abrasion resistance, impact resistance, water-proofness, weather-proofness and chemicals-proofness. The cord can be readily tied. The knots do not come easily untied. Further the cord does not extend or stretch. The tape is thin, light, not bulky and can adhere closely to the package.

The present invention will be explained by way of examples as follows:

EXAMPLE 1

Production of Superstrong Cord

13–18 parts of pure completely saponified polyvinyl alcohol of 1700 polymerization degree were dissolved in 87–82 parts of water to give an aqueous polyvinyl alcohol solution. This solution was continuously extruded into a saturated aqueous solution of sodium sulfate to give 350 filaments, a filament being 10 denier. 350 filaments were made or combined into a unit fiber bundle of 3500 denier and dried temporarily. The bundle was repeatedly immersed 5–6 times in a coating apparatus containing the same aqueous polyvinyl alcohol solution in such a manner that about 1.6 cc. of polyvinyl alcohol solution per 1 meter of the cord was adhered on the cord. The immersed cord was dried by means of hot air at 130° C. and at once subjected to a first twisting operation, thereafter a 2-piece set of cords was subjected to a second twisting operation and finally taken up under a speed of 3–7 m. per minute.

EXAMPLE 2

Production of superstrong tape

Fifteen parts of pure completely saponified polyvinyl alcohol of 1700 polymerization degree were dissolved in 85 parts of water to give an aqueous polyvinyl alcohol solution. This solution was continuously extruded into a saturated aqueous solution of sodium sulfate to give 350 filaments, one filament being 10 denier. Said 350 filaments were made or combined into a unit fiber bundle of 3500 denier. A number of said bundles were arranged side-by-side into a 13 mm. width and dried temporarily by passing through a propane gas drying apparatus consisting of 8 drying cylinders at a temperature of 180°–230° C. operating at a speed of 3 meter per minute. The temporarily dried tape was repeatedly immersed several times in a coating apparatus containing the same aqueous polyvinyl alcohol solution in such a manner that 15 cc. of said resin solution per 1 meter of the tape were adhered on the tape and at the same time subjected to a tentering operation, thereafter the tape was finally dried by passing it through a propane gas drying apparatus consisting of 18 drying cylinders operating at a temperature of 180° C. and at a speed of 3 meter per minute.

EXAMPLE 3

Production of superstrong adhesive tapes

An aqueous silicon solution of about 1/1000 concentration was applied on one side of the tape produced in example 2 and dried. To the other side of the tape an adhesive solution having the following composition was applied.

| | |
|---|---|
| Trichloroethylene | 88 parts |
| Crude rubber | 3 parts |
| Synthetic rubber of polychloroprene series | 5 parts |
| Artificial resin glue (Arakawa Rinsan) | 2 parts |
| Viscosity increasing agent (if necessary) | 2 parts |

The tape with the adhesive applied thereto was dried by passing it through a propane gas drying apparatus consisting of 8 drying cylinders.

I claim:
1. A method of making a superstrong cord comprising,
   1. continuously extruding a multiplicity of polyvinyl alcohol filaments from an aqueous polyvinyl alcohol solution,
   2. combining a multiplicity of said polyvinyl alcohol filaments into a continuous bundle,

3. repeatedly immersing the continuous filament bundle into the same polyvinyl alcohol solution from which the filaments are made,
4. drying the filament bundle, and
5. subjecting said dried filament bundle to first and second twisting operations.

2. A method of making a superstrong tape comprising,
1. extruding a multiplicity of continuous polyvinyl alcohol filaments from an aqueous polyvinyl alcohol solution,
2. combining a plurality of the polyvinyl alcohol filaments into separate continuous filament bundles,
3. arranging a predetermined number of said filament bundles in side-by-side relation to form a tape of desired width,
4. drying the tape,
5. repeatedly immersing the tape into the same polyvinyl alcohol solution from which the filaments are made,
6. tentering the tape, and
7. drying the tape.

3. The method as set forth in claim 1 including after step 7, applying an adhesive solution on one side of the tape, and drying the adhesive solution on the tape.

4. A superstrong cord comprising a plurality of substantially continuous polyvinyl alcohol fibers disposed in substantially parallel and substantially touching relation forming a bundle of said fibers, and a binder of the same polyvinyl alcohol from which said fibers are formed adhered on and between the said plurality of fibers, fixing all of said fibers together in said bundle as a unit body.

5. A superstrong tape comprising a plurality of substantially continuous bundles of said polyvinyl alcohol fibers as set forth in claim 7 connected in the same plane in side-by-side substantially touching relation, and a binder of the same polyvinyl alcohol from which said bundles are formed adhered on and between said bundles and fixedly encapsuling said plurality of bundles together as a unit tape body.

6. A superstrong tape as set forth in claim 5, in which said unit tape body has a substantially continuous surface of predetermined width, and including an adhesive coating connected to said surface forming a superstrong adhesive tape.

* * * * *